(12) United States Patent
Shimizu

(10) Patent No.: US 10,997,182 B2
(45) Date of Patent: May 4, 2021

(54) INFORMATION PROCESSING APPARATUS, AND NON-TRANSITORY COMPUTER READABLE MEDIUM STORING AN INFORMATION PROCESSING PROGRAM

(71) Applicant: FUJI XEROX CO., LTD., Tokyo (JP)

(72) Inventor: Tomoyuki Shimizu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/511,024

(22) Filed: Jul. 15, 2019

(65) Prior Publication Data

US 2020/0311089 A1 Oct. 1, 2020

(30) Foreign Application Priority Data

Mar. 25, 2019 (JP) .............................. JP2019-057418

(51) Int. Cl.
*G06F 3/048* (2013.01)
*G06F 16/2457* (2019.01)
*G06F 16/248* (2019.01)

(52) U.S. Cl.
CPC ...... *G06F 16/24573* (2019.01); *G06F 16/248* (2019.01)

(58) Field of Classification Search
None
See application file for complete search history.

(56) References Cited

U.S. PATENT DOCUMENTS

| 7,809,714 B1* | 10/2010 | Smith ................ G06F 16/2425 707/713 |
| 10,534,783 B1* | 1/2020 | Raczko ................ G06F 16/248 |
| 2010/0332404 A1* | 12/2010 | Valin .................... G06Q 99/00 705/310 |
| 2013/0166590 A1* | 6/2013 | Kim ........................ G06F 16/48 707/769 |
| 2016/0080397 A1* | 3/2016 | Bacastow ............... H04L 63/20 726/1 |
| 2016/0255139 A1* | 9/2016 | Rathod .................. H04L 51/046 709/203 |
| 2016/0306798 A1* | 10/2016 | Guo .................. G06F 16/24575 |
| 2017/0160718 A1* | 6/2017 | Tanabe ................. G05B 19/402 |
| 2017/0185679 A1* | 6/2017 | Anand ................ G06F 16/9535 |
| 2018/0068025 A1* | 3/2018 | Gadepalli ............ G06F 16/248 |
| 2019/0050406 A1* | 2/2019 | Nguyen ............ G06F 16/24535 |
| 2020/0159861 A1* | 5/2020 | Baeck ................... H04L 67/327 |

FOREIGN PATENT DOCUMENTS

| JP | 2007-183819 A | 7/2007 |
| JP | 2009-251707 A | 10/2009 |

* cited by examiner

*Primary Examiner* — David Phantana-angkool
(74) *Attorney, Agent, or Firm* — Oliff PLC

(57) ABSTRACT

There is provided an information processing apparatus including an acquiring unit and a presenting unit. The acquiring unit acquires at least one character being input and user information. The presenting unit searches among pieces of suggest information for a keyword including the at least one character acquired by the acquiring unit, and the pieces of suggest information are generated or updated by using pieces of document information registered in advance for each operation. The presenting unit prioritizes a piece of suggest information including a keyword that relates to an operation associated in advance with the user information. The presenting unit presents the piece of suggest information thus prioritized.

20 Claims, 14 Drawing Sheets

KEYWORD RELATING TO OPERATION ASSOCIATED WITH
REQUIREMENTS ANALYSIS IS PRIORITIZED
AND SUGGESTED

KEYWORD RELATING TO OPERATION ASSOCIATED WITH
DESIGNING IS PRIORITIZED AND SUGGESTED

12
INFORMATION PROCESSING APPARATUS, AND NON-TRANSITORY COMPUTER READABLE MEDIUM STORING AN INFORMATION PROCESSING PROGRAM

CROSS-REFERENCE TO RELATED APPLICATIONS

This application is based on and claims priority under 35 USC 119 from Japanese Patent Application No. 2019-057418 filed Mar. 25, 2019.

BACKGROUND (i) Technical Field

The present disclosure relates to an information processing apparatus, and a non-transitory computer readable medium storing an information processing program.

(ii) Related Art

Japanese Unexamined Patent Application Publication No. 2007-183819 proposes a document file search system that enables a user who searches for a document file necessary for an operation to easily find the document file necessary for the operation without requiring any knowledge of a document name or a keyword. In more detail, the document file search system proposed by Japanese Unexamined Patent Application Publication No. 2007-183819 includes a process review unit and a document search unit. The process review unit sends a review request to a process flow database that stores process flows of operations, and the document search unit sends a search request to a document file database that stores document files relating to the process flows.

Japanese Unexamined Patent Application Publication No. 2009-251707 proposes a search system that assigns search keywords to an operation for which procedures based on a plurality of work processes are established and that extracts and displays document data relating to the search keywords. In more detail, the search system proposed by Japanese Unexamined Patent Application Publication No. 2009-251707 includes a unit for assigning keywords to each work process, a unit for specifying search keywords for a work process, and a unit for generating a weighted keyword by assigning a weight to a keyword assigned to a work process other than the work process for which the search keywords are specified. The weight indicates the degree to which the keyword is related to the work process for which the search keywords are specified. The search system extracts document data relating to an operation in accordance with the search keywords and the weighted keywords.

SUMMARY

Aspects of non-limiting embodiments of the present disclosure relate to providing an information processing apparatus, an information processing system, and a non-transitory computer readable medium storing an information processing program that do not require a user to individually assign in advance keywords to operations such as work processes and steps included in work processes and that are able to present as a piece of suggest information a keyword relating to an operation associated with input characters.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including an acquiring unit and a presenting unit. The acquiring unit acquires at least one character being input and user information. The presenting unit searches among pieces of suggest information for a keyword including the at least one character acquired by the acquiring unit, and the pieces of suggest information are generated or updated by using pieces of document information registered in advance for each operation. The presenting unit prioritizes a piece of suggest information including a keyword that relates to an operation associated in advance with the user information. The presenting unit presents the piece of suggest information thus prioritized.

BRIEF DESCRIPTION OF THE DRAWINGS

An exemplary embodiment of the present disclosure will be described in detail based on the following figures, wherein.

DETAILED DESCRIPTION

Figure 1:
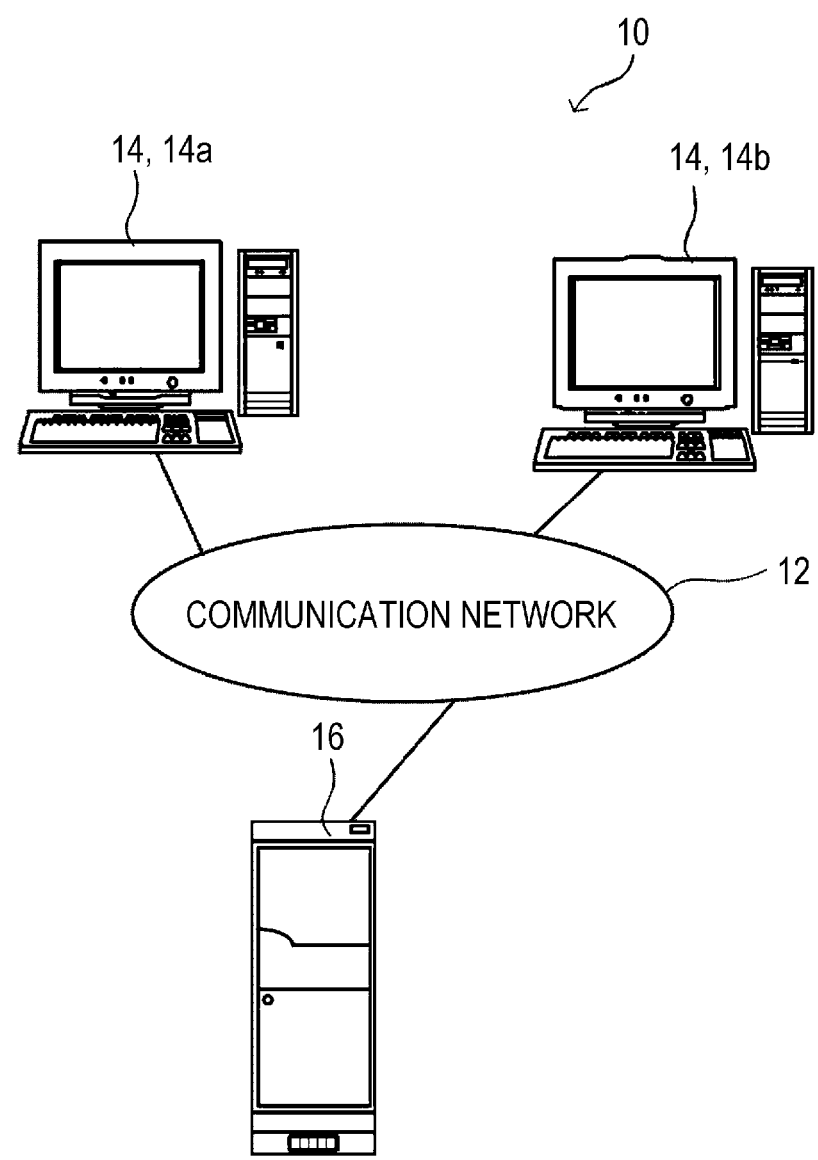
FIG. 1 depicts a schematic configuration of an information processing system according to the present exemplary embodiment.

Hereinafter, an example of the present exemplary embodiment will be described in detail with reference to the drawings. In the present exemplary embodiment, an information processing system in which a plurality of information processing terminals and a server are connected to each other via a communication network including various kinds of networks will be described as an example. FIG. 1 depicts a schematic configuration of an information processing system 10 according to the present exemplary embodiment.

As depicted in FIG. 1, the information processing system 10 according to the present exemplary embodiment includes a plurality of information processing terminals 14a, 14b, . . . and a cloud server 16 as an information processing apparatus. When the plurality of information processing terminals 14a, 14b, . . . need not be specified and described individually, an appended alphabetical character may be omitted. In the present exemplary embodiment, an example in which the plurality of information processing terminals 14a, 14b, . . . are included will be described, but a single information processing terminal 14 may be included.

The information processing terminals 14 and the cloud server 16 are connected to each other via a communication network 12, such as a local area network (LAN), a wide area network (WAN), the Internet, or an intranet. The information processing terminals 14 and the cloud server 16 are capable of transmitting and receiving various kinds of data to and from each other via the communication network 12.

In the information processing system 10 according to the present exemplary embodiment, the cloud server 16 provides a document management service to manage documents as a cloud service. In the document management service, for example, accessing the cloud server 16 from the information processing terminals 14 provides capabilities such as storage of various documents as pieces of information in the cloud server 16 and retrieval for review of managed documents stored in the cloud server 16.

Figure 2:
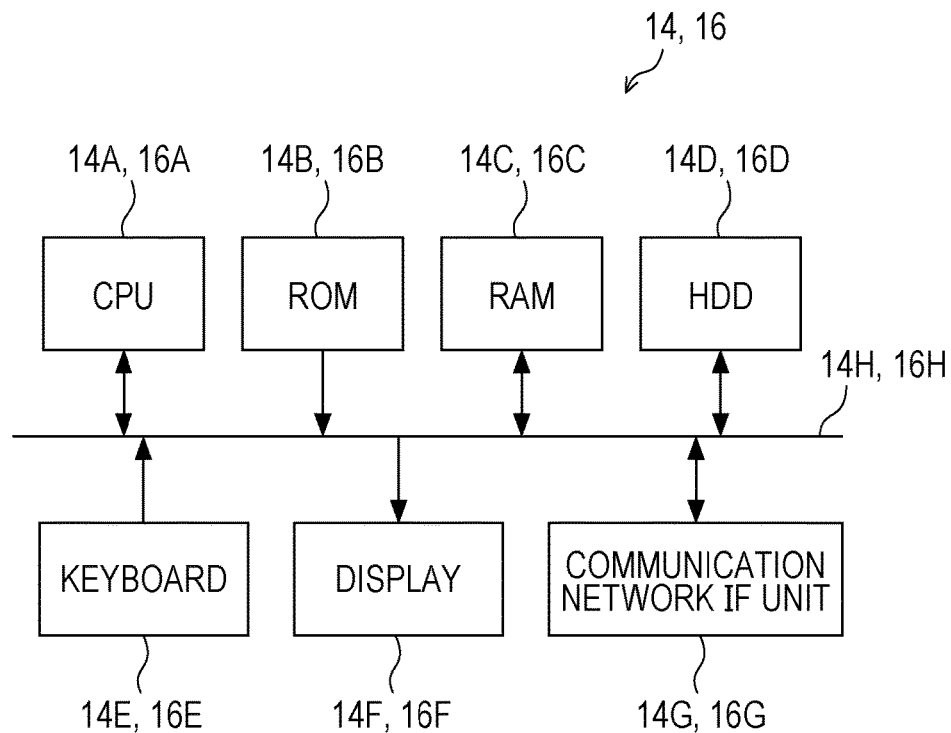
FIG. 2 is a block diagram depicting a configuration of major electrical components of an information processing terminal and a cloud server in the information processing system according to the present exemplary embodiment.

Next, a configuration of major electrical components of the information processing terminal 14 and the cloud server 16 according to the present exemplary embodiment will be described. FIG. 2 is a block diagram depicting the configuration of major electrical components of the information processing terminal 14 and the cloud server 16 in the information processing system 10 according to the present exemplary embodiment. The information processing terminal 14 and the cloud server 16 are designed to have a basic configuration of a general-purpose computer, and thus the information processing terminal 14 represents the cloud server 16 and will be described.

The information processing terminal 14 according to the present exemplary embodiment includes a central processing unit (CPU) 14A, a read-only memory (ROM) 14B, a random-access memory (RAM) 14C, a hard disk drive (HDD) 14D, a keyboard 14E, a display 14F, and a communication network interface (IF) unit 14G, as depicted in FIG. 2. The CPU 14A manages the entire operation of the information processing terminal 14. The ROM 14B stores various control programs, various parameters, and the like in advance. The RAM 14C is used as a work area and the like while the CPU 14A executes various programs. The HDD 14D stores various kinds of data, application programs, and the like. The keyboard 14E is used for inputting various kinds of information. The display 14F is used for displaying various kinds of information. The communication network IF unit 14G is connected to the communication network 12 and transmits and receives various kinds of data to and from other apparatuses connected to the communication network 12. All the above units in the information processing terminal 14 are electrically connected to each other via a system bus 14H. In the information processing terminal 14 according to the present exemplary embodiment, although the HDD 14D is adopted as a storage unit, this is not meant to be limiting, and a different nonvolatile storage unit, such as a flash memory, may be adopted.

In the above configuration of the information processing terminal 14 according to the present exemplary embodiment, the CPU 14A performs access to the ROM 14B, the RAM 14C, and the HDD 14D, acquisition of various kinds of data via the keyboard 14E, and display of various kinds of information on the display 14F. In the information processing terminal 14, the CPU 14A also controls transmission and reception of communication data via the communication network IF unit 14G.

In the information processing system 10 according to the present exemplary embodiment, which is configured in this way, the cloud server 16 provides the document management service to manage documents as a cloud service, as described above. For example, a piece of information stored in the information processing terminal 14 is moved to the cloud server 16 as a document to be managed, and the cloud server 16 manages the document.

Figure 3:
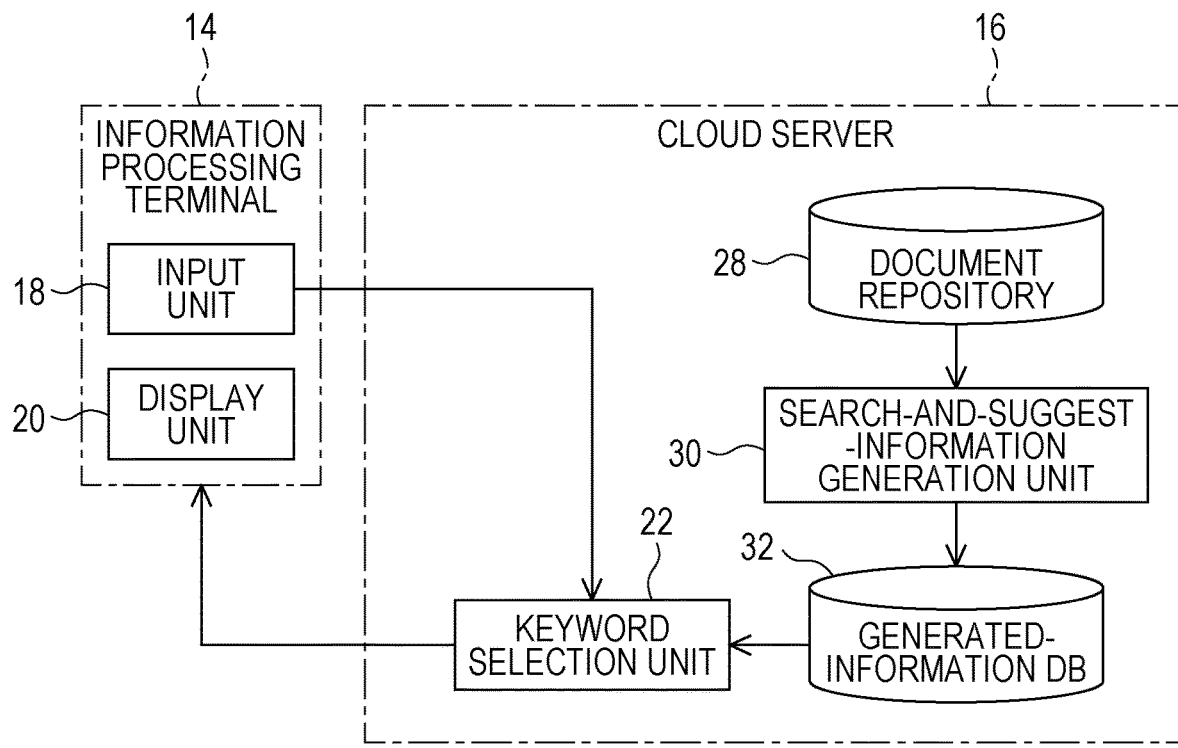
FIG. 3 is a functional block diagram of the information processing terminal and the cloud server in the information processing system according to the present exemplary embodiment.

Next, a functional configuration of each of the information processing terminal 14 and the cloud server 16 in the information processing system 10, which is configured as described above, according to the present exemplary embodiment will be described. FIG. 3 is a functional block diagram of the information processing terminal 14 and the cloud server 16 in the information processing system 10 according to the present exemplary embodiment.

In the present exemplary embodiment, the cloud server 16 has a function to support a user who performs search. When a user who uses the information processing terminal 14 to search for a piece of document information stored by using the document management service inputs a character, the cloud server 16 presents to the information processing terminal 14 a piece of suggest information corresponding to a character or a character sequence that is being input.

A major portion of the information processing terminal 14 has functions of an input unit 18 and a display unit 20.

The input unit 18 receives a character or a character sequence via the keyboard 14E and the like, and the display unit 20 displays various kinds of information on the display 14F.

The cloud server 16 has functions of a keyword selection unit 22, a document repository 28, a search-and-suggestinformation generation unit 30, and a generated-information database (DB) 32 as an acquiring unit, an accepting unit, and a presenting unit.

The document repository 28 stores pieces of document information that are created or transmitted by using the information processing terminal 14 and the like and that are to be managed by using the document management service. In addition, in the present exemplary embodiment, each piece of document information is associated with an operation such as a work process or an individual step included in a work process and stored in the document repository 28.

When a piece of document information is stored in the document repository 28, a piece of search information to be used for searching for the piece of document information is generated from the piece of document information by the search-and-suggest-information generation unit 30. In addition or alternatively, when a piece of document information is changed, a piece of search information is changed in accordance with the piece of document information that is changed. Further, when a piece of search information is generated or changed, a piece of suggest information is generated from the piece of search information. A piece of suggest information is generated or changed simultaneously with the generation or change of a piece of search information. In this case, "simultaneously" means that a piece of suggest information is stored in a memory region at the same time as a piece of search information is stored in a memory region. However, a certain amount of time lag (for example, a few seconds to a few minutes) is allowed for recording a piece of suggest information. The upper limit to the amount of time lag is equal to the period of time that elapses before a first character of a character sequence is input.

The search-and-suggest-information generation unit 30 conducts, for example, a morphological analysis of a piece of search information and extracts a noun, which is used as a suggest keyword, to generate or change a piece of suggest information. For example, when a piece of document information such as text is stored, the search-and-suggest-information generation unit 30 may extract the first text content or the like from the document content represented by the piece of document information. Then, the search-and-suggest-information generation unit 30 may extract a noun from the extracted text content and generate or change a suggest keyword.

Figure 4:
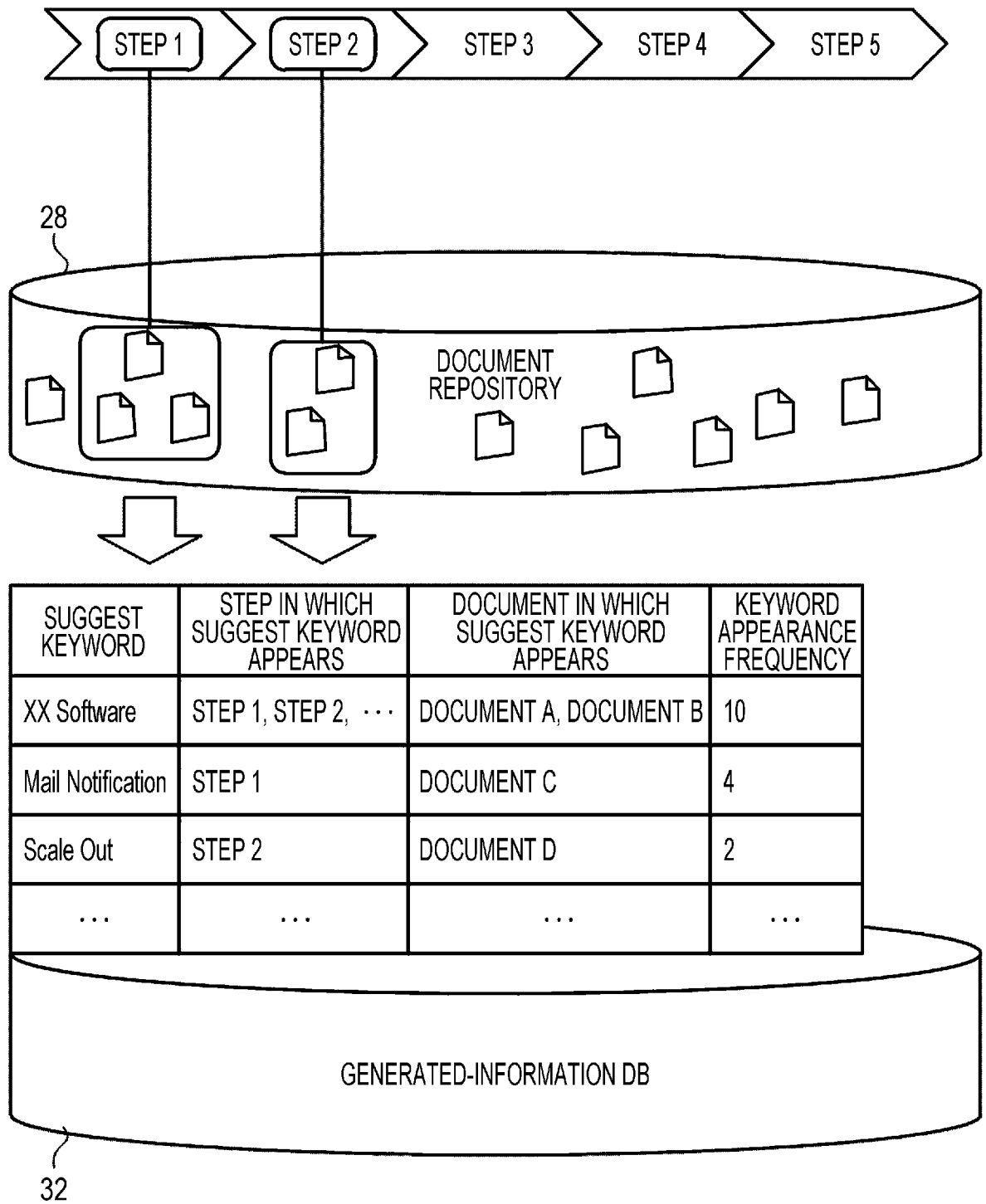
FIG. 4 is an illustration for depicting information stored in a generated-information database (DB)

In addition, as depicted in FIG. 4, the search-and-suggest-information generation unit 30 stores, in association with a suggest keyword that is extracted, a step in which the suggest keyword appears in a work process, a document in which the suggest keyword appears, a keyword appearance frequency, and the like as a table in the generated-information DB 32.

The generated-information DB 32 stores the above table associated with suggest keywords along with pieces of search information and pieces of suggest information generated by the search-and-suggest-information generation unit 30.

Figure 5:
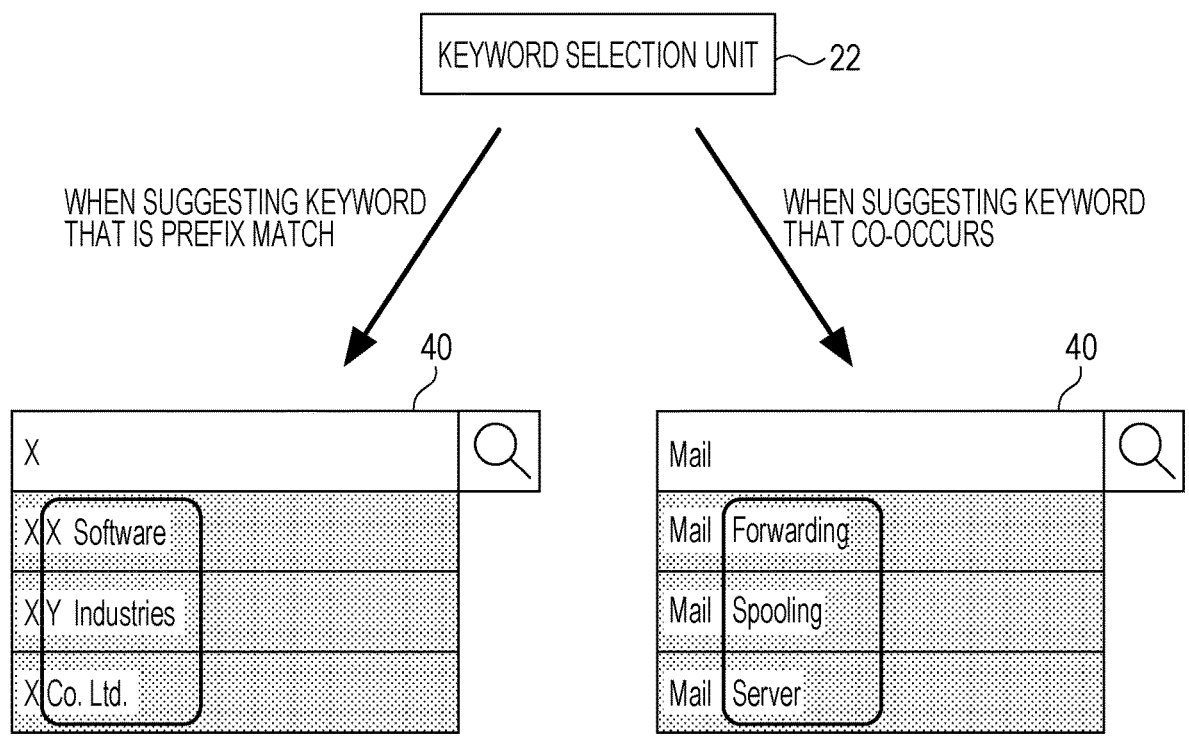
FIG. 5 is an illustration for depicting a method of selecting keywords as pieces of suggest information by using a keyword selection unit.

When a character or a character sequence is input from the input unit 18 in the information processing terminal 14, the keyword selection unit 22 acquires the character or the character sequence that has been input. The keyword selection unit 22 also acquires user information to identify the user who operates the information processing terminal 14. Then, the keyword selection unit 22 extracts, as a suggest candidate, a piece of suggest information associated with the character or character sequence, which has been acquired, from pieces of suggest information stored in the generated-information DB 32. For example, as depicted in FIG. 5, the keyword selection unit 22 may extract a keyword that is a prefix match for a character sequence that is input into a search field 40. In the example in FIG. 5, keywords each of which is a prefix match for "X", namely "XX Software", "XY Industries", and "X Co. Ltd.", are presented as pieces of suggest information. Alternatively, as depicted in FIG. 5, the keyword selection unit 22 may extract a keyword that co-occurs with a character sequence that is input into the search field 40. In the example in FIG. 5, keywords that co-occur with "Mail", namely "Mail Forwarding", "Mail Spooling", and "Mail Server", are presented as pieces of suggest information.

Figure 6:
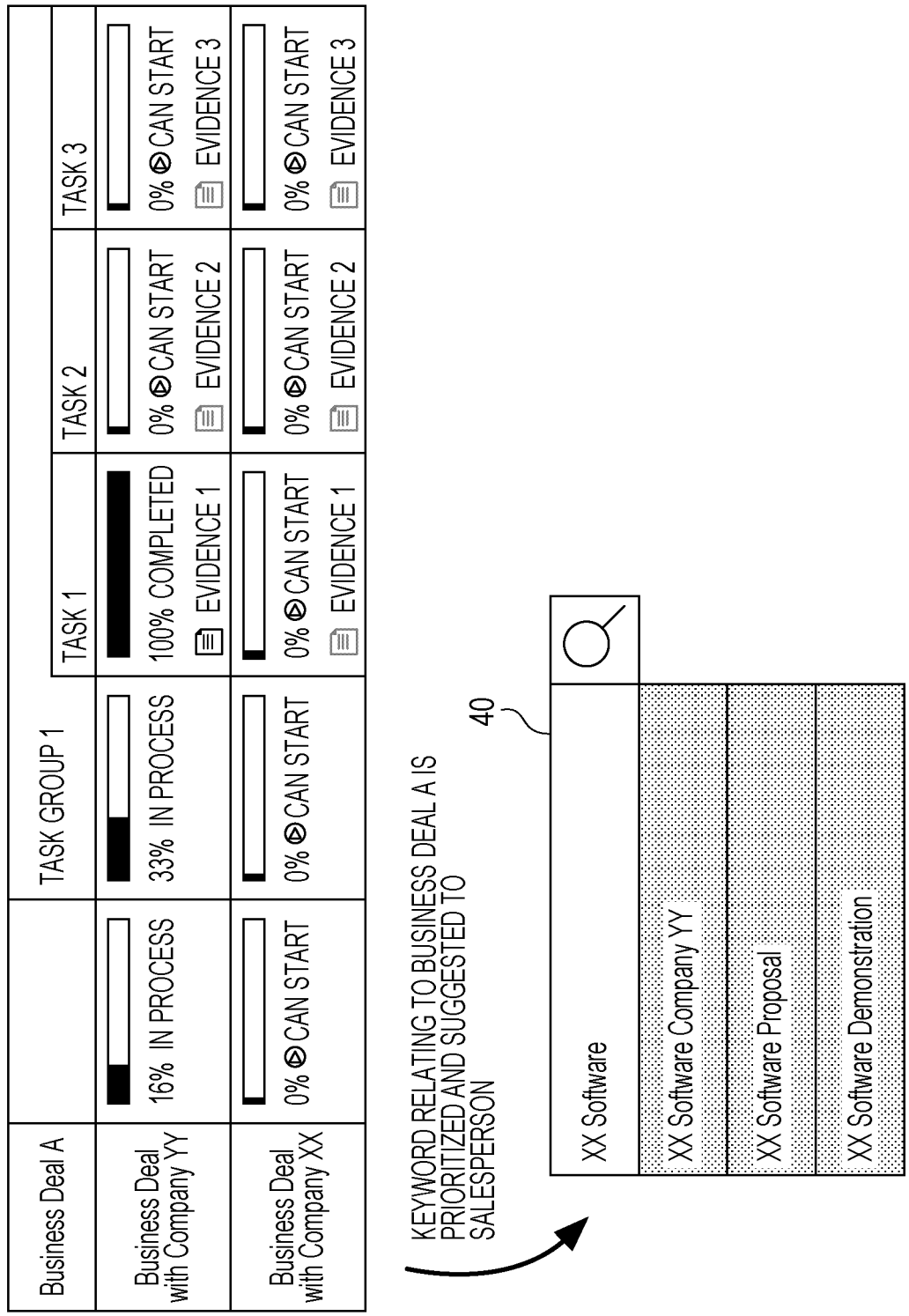
FIG. 6 is an illustration of an example of pieces of suggest information that are presented in a case where a user who has input characters is a salesperson involved in a work process Business Deal A.
Figure 7:
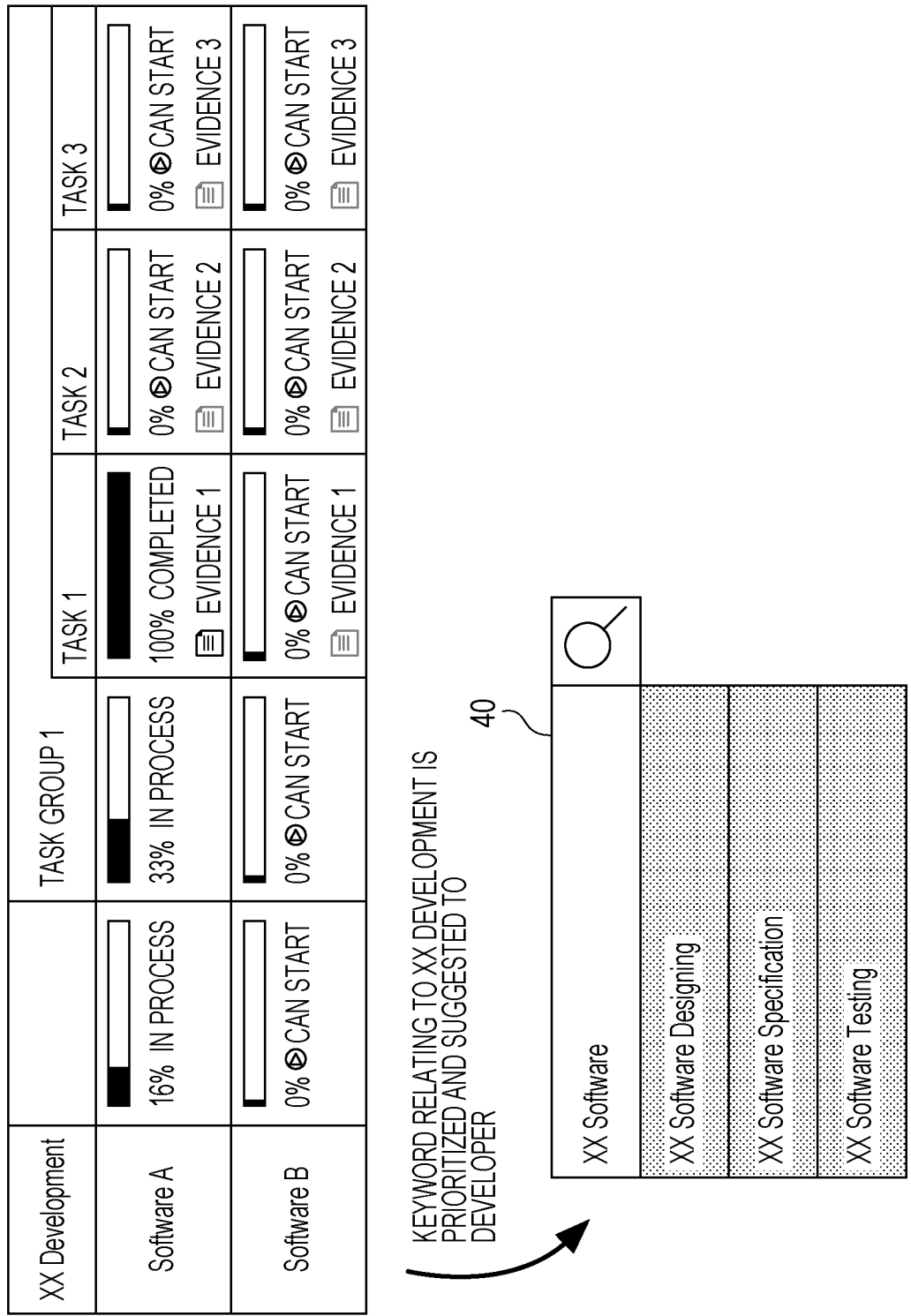
FIG. 7 is an illustration of an example of pieces of suggest information that are presented in a case where a user who has input characters is a developer involved in a work process XX Development.

Further, in the present exemplary embodiment, when extracting a suggest candidate as a piece of suggest information, the keyword selection unit 22 uses user information, identifies an operation in which the user is involved, and extracts a suggest keyword relating to the identified operation. Then, the keyword selection unit 22 transmits the extracted suggest keyword to the information processing terminal 14 as a piece of suggest information. In this way, the piece of suggest information is presented on the display 14F by the display unit 20 in the information processing terminal 14. For example, if a user who has input characters is a salesperson involved in a work process Business Deal A, keywords relating to Business Deal A, which are prioritized, are extracted and suggested, as depicted in FIG. 6. If a user who has input characters is a developer involved in a work process XX Development, keywords relating to XX Development, which are prioritized, are extracted and suggested, as depicted in FIG. 7. In this way, since keywords relating to an operation in which a user is involved are suggested, the efficiency in searching for target document information is improved. In addition, a new appointee who is assigned to participate in an operation without having deep knowledge regarding the operation can obtain hints on the search from the suggested keywords.

In the present exemplary embodiment, suggesting a keyword means that a keyword to be used in search criteria is proposed or presented for suggestion. In addition, search criteria for efficiently narrowing down pieces of document information to obtain a search result that a user wants are presented. These features enable the presentation of a character sequence for complementing a character sequence being input and the presentation of a word deeply relating to a word being input. Consequently, the time required for an input is expected to be reduced, and new hints on search criteria are expected to be provided.

Figure 8:
FIG. 8 is an illustration for depicting a method for keyword suggestion based on the progress of a work process.
Figure 8:
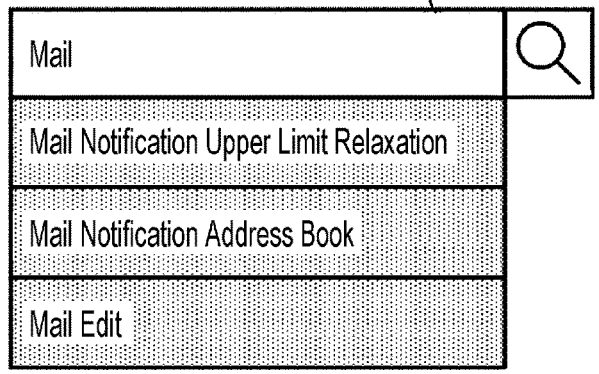
Figure 8:
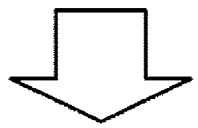
Figure 8:
Figure 8:
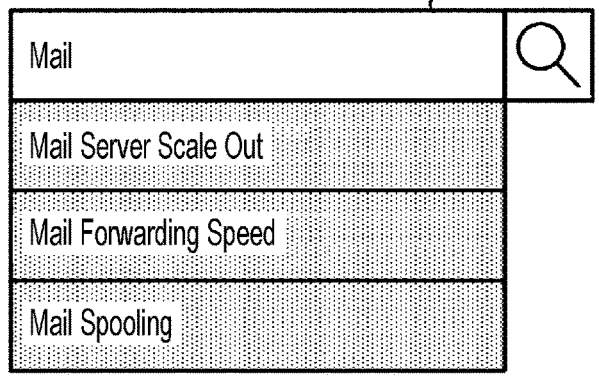

Next, a specific example in which a keyword is selected as a piece of suggest information by the keyword selection unit 22 will be described. FIG. 8 is an illustration for depicting a method for keyword suggestion based on the progress of a work process.

In the example in FIG. 8, an example of a work process XX Software Development is depicted. The work process includes steps, Requirements Analysis, Specification Examination, Designing, Implementation, and Testing.

If the present step in the work process is Requirements Analysis, keywords relating to the operation Requirements Analysis are prioritized for selection and suggested by the keyword selection unit 22. In the example in FIG. 8, when "Mail" is input in the search field 40, "Mail Notification Upper Limit Relaxation", "Mail Notification Address Book", and "Mail Edit" are suggested as keywords relating to the operation Requirements Analysis. Keywords to efficiently search for materials containing a requirement relating to Mail among an enormous number of materials are suggested.

If the process proceeds and the present step in the work process is Designing, keywords relating to the operation Designing are prioritized for selection and suggested by the keyword selection unit 22. In the example in FIG. 8, when "Mail" is input in the search field 40, "Mail Server Scale Out", "Mail Forwarding Speed", and "Mail Spooling" are suggested as keywords relating to the operation Designing. It is to be noted that search may also be performed among materials in the past (pieces of document information relating to other work processes).

Figure 9:
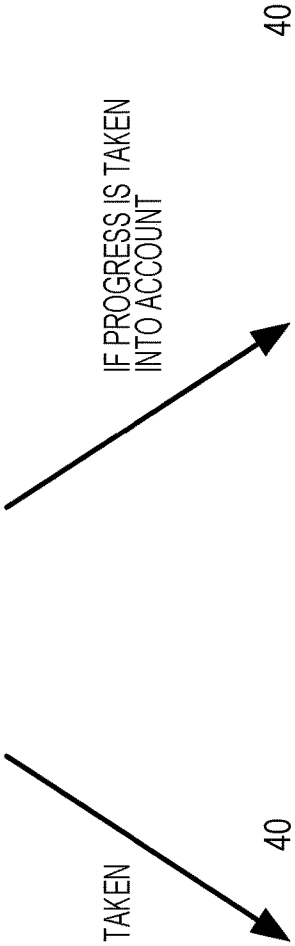
FIG. 9 is an illustration for depicting an example in which keywords are selected in accordance with a percentage of completion and presented for suggestion.

Next, a specific example in which the keyword selection unit 22 selects a keyword in accordance with progress or a percentage of completion and suggests the keyword will be described. FIG. 9 is an illustration for depicting the example in which keywords are selected in accordance with a percentage of completion and suggested.

The keyword selection unit 22 prioritizes for selection and suggests a keyword relating to a work process whose progress is slow and that is urgent. For example, as depicted in FIG. 9, when "Business Deal" is input into the search field 40, if the progress is not taken into account, "Business Deal Success Rate", "Business Deal Rule", and "Business Deal List" are selected and suggested. In contrast, if the progress is taken into account, keywords relating to Business Deal B, which is urgent, are prioritized for selection and suggested. In the example in FIG. 9, "Business Deal B", "Business Deal B Visit" and "Business Deal B Quote" are selected and suggested. In this way, the efficiency in searching for various materials relating to Business Deal B is improved.

Figure 10:
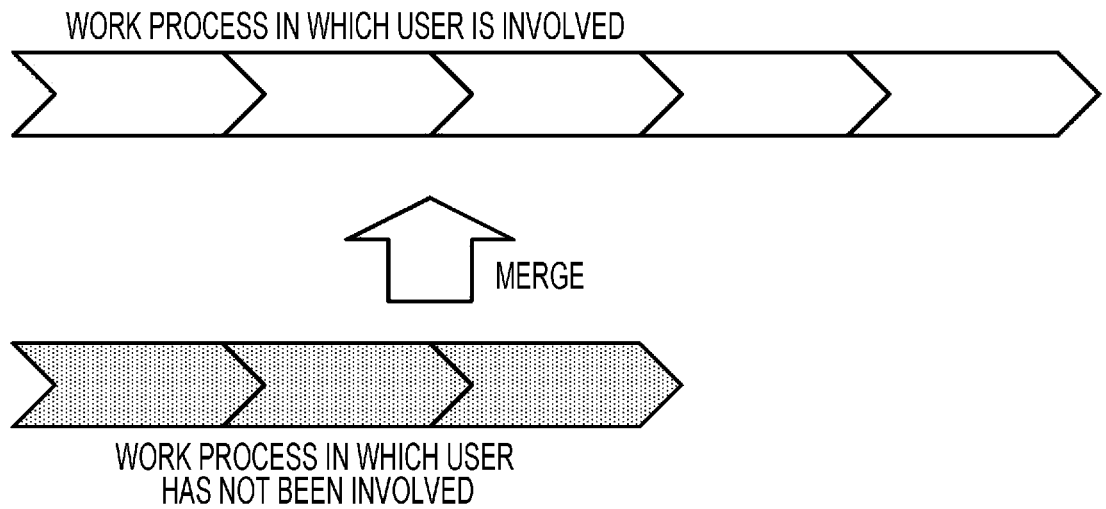
FIG. 10 is a diagram for depicting an example in which another work process merges into a work process.

Next, the case where another work process merges into a work process will be described. FIG. 10 is a diagram for depicting an example in which another work process merges into a work process.

As depicted in FIG. 10, if another work process in which the user has not heavily been involved or has not been assigned to participate merges into a work process in which the user is involved, a keyword relating to the work process in which the user has not heavily been involved or has not been assigned to participate is extracted and suggested.

If a work process in which the user has not been involved merges into a work process in which the user is involved, the user can obtain enlightenment and hints on the search from the suggested keywords.

Figure 11:
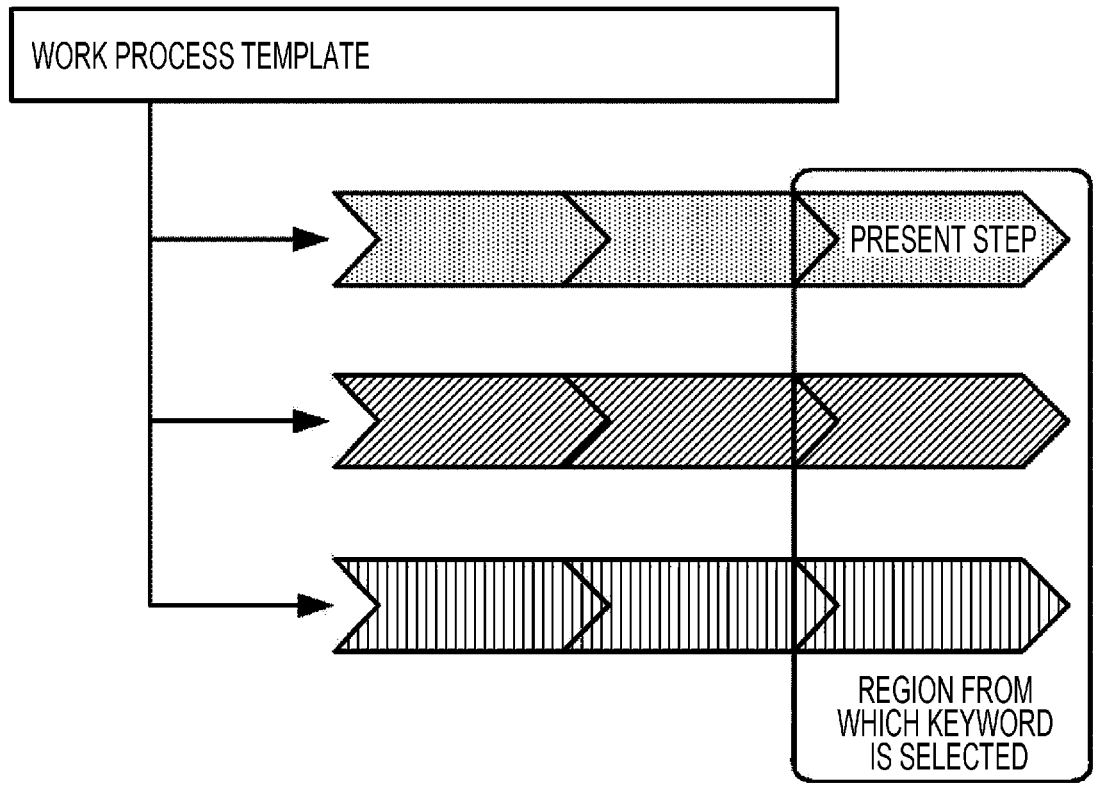
FIG. 11 is a diagram for depicting an example in which, in the case of a work process generated by using the same work process template as is used for other work processes, a keyword to be presented for suggestion is selected from keywords relating to the same steps in the other work processes.

If a work process is generated by using the same work process template, in other words, if a plurality of work processes having a similar structure are present, a keyword to be suggested may be selected from keywords relating to similar steps in the plurality of work processes. Documents relating to a similar step in a similar work process contain plenty of reference information. Thus, as depicted in FIG. 11, selecting a keyword from steps similar to the present step improves the efficiency in searching for a document. This process is applied, for example, when the user wants to reference a document relating to Designing in the past.

Figure 12:
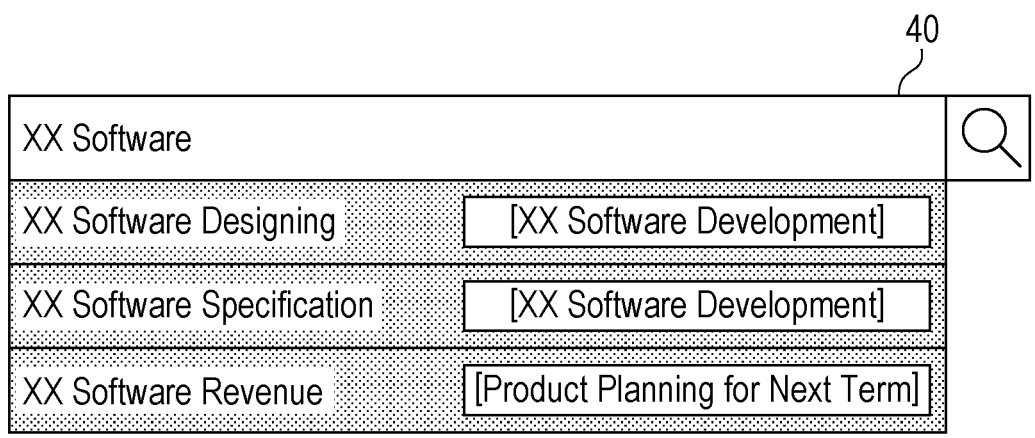
FIG. 12 is an illustration depicting an example in which a work process associated with a keyword presented for suggestion is presented along with the keyword.

When a keyword is suggested, a work process associated with the keyword may be presented simultaneously as depicted in FIG. 12. FIG. 12 depicts an example in which a work process associated with a suggested keyword is presented along with the suggested keyword. In the example in FIG. 12, when "XX Software" is input into the search field 40, "XX Software Designing", "XX Software Specification", and "XX Software Revenue" are suggested. In addition, in this example, "XX Software Development" is presented as the work process associated with each of "XX Software Designing" and "XX Software Specification", and "Product Planning for Next Term" is presented as the work process associated with "XX Software Revenue".

If a work process that does not relate to a search intension is present, the user may be allowed to exclude the work process from a region from which a suggest keyword is selected. In addition, the user may be allowed to explicitly specify a work process from which a suggest keyword is selected. For example, if the user is now involved in the operation of product planning for the next term and does not want to search by using a keyword relating to a development operation (for example, keywords such as "Designing" and "Testing"), "XX Software Development" is excluded from a region from which a suggest keyword is selected. For example, selecting "Exclude" next to "XX Software Development" depicted in FIG. 13 enables the user to exclude XX Software Development from a region from which a keyword is selected. It is to be noted that a region from which a keyword is selected indicates work processes from which a keyword to provide hints on search criteria is obtained and does not indicate a region in which a piece of document information is searched for, which is referred to as a region to be searched. Since a region from which a suggest keyword is selected differs from a region to be searched, by using a suggested keyword, a piece of document information helpful in performing the present operation may be searched for among other work processes in the past, in the entire document repository 28, and the like.

Figure 14:
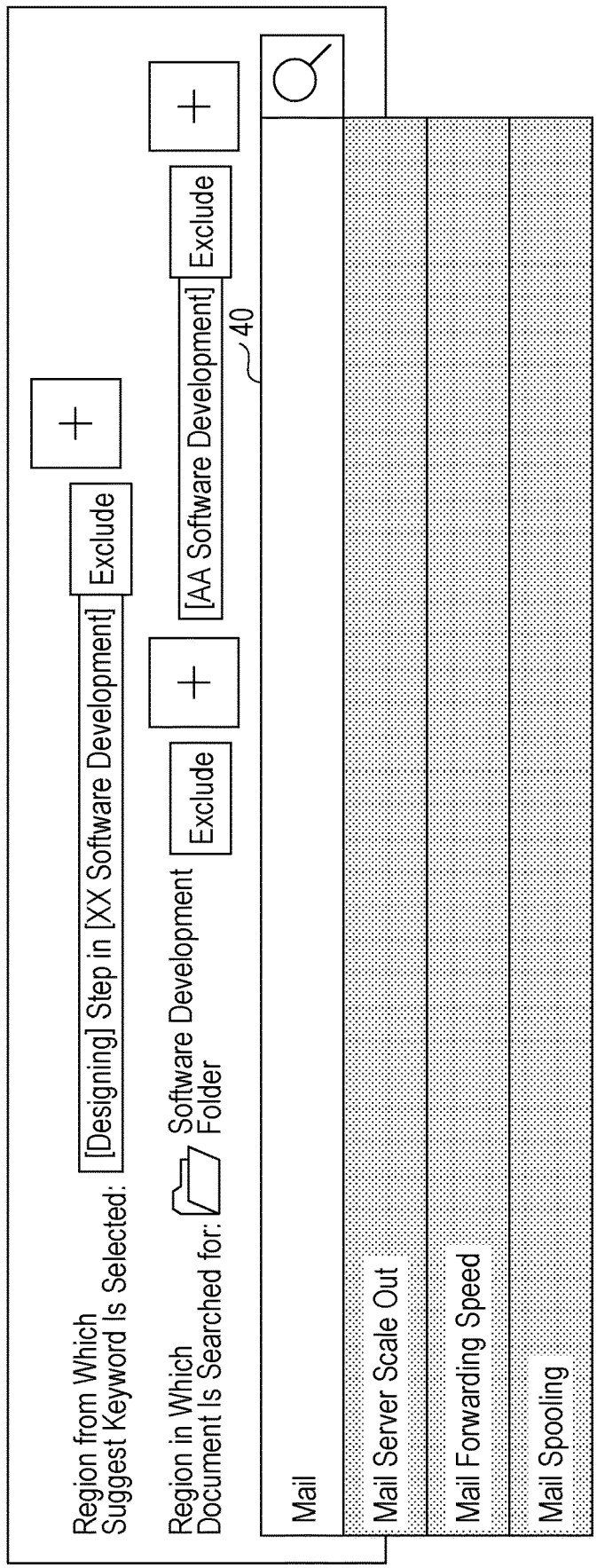
FIG. 14 is an illustration for depicting an example in which a user is able to narrow down a region from which a suggest keyword is selected to a step in a work process.

The user may be allowed to narrow down a region from which a suggest keyword is selected to each step in a work process. For example, as depicted in FIG. 14, separately from a region from which a suggest keyword is selected, the user may be allowed to specify the inside of a specific folder or a specific work process when specifying a region to be searched. A specific case of a user tackling the design of a mail transmission function in the operation XX Software Development will be described. If the user wants to obtain hints on search criteria from XX Software Development and wants to use the search criteria to obtain reference information from pieces of software developed in the past, as depicted in FIG. 14, a region from which a suggest keyword is selected is set to [Designing] Step in [XX Software Development], and a region to be searched is set to the work process AA Software Development in the folder Software Development Folder. Using these settings to search for a piece of document information is expected to provide a successful result.

Figure 15:
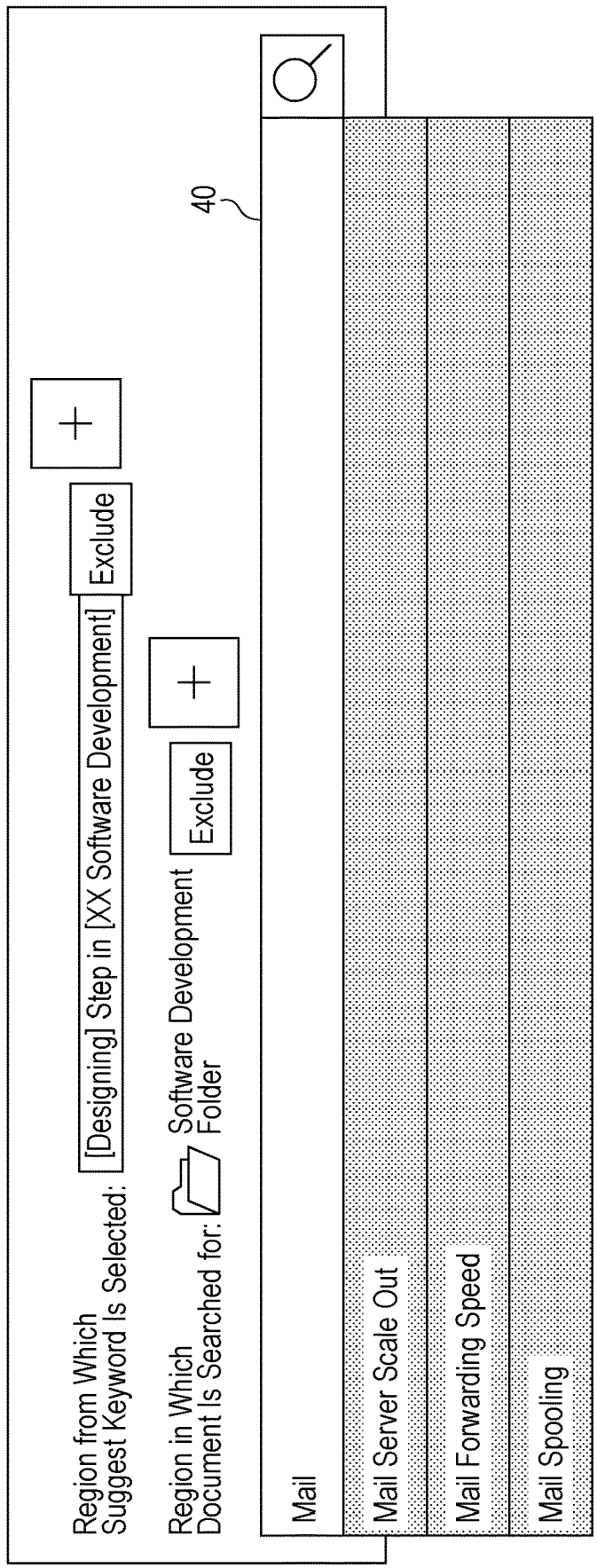
FIG. 15 is an illustration for depicting an example in which a user is able to specify a folder or the like as a region to be searched, separately from a region from which a suggest keyword is selected.

If the user wants a search target to include information relating to work processes in which the user is not involved and wants the information as a reference material for the present operation, the user is not expected to be able to explicitly specify a region from which a keyword is selected because the work processes, in which the user is not involved, are invisible to the user. Accordingly, since the user is sometimes unable to access work processes associated with pieces of document information that are stored in the document repository 28 and that are allowed to be searched for and reviewed, the user may be allowed to designate a folder or the like as a region to be searched, separately from a region from which a suggest keyword is selected. For example, as depicted in FIG. 15, a region from which a suggest keyword is selected is set to [Designing] Step in [XX Software Development], and a region to be searched is set to the folder Software Development Folder. Search is performed using these settings.

Next, a process performed by the cloud server 16 in the information processing system 10 according to the present exemplary embodiment, which is configured as described above, will be described. In the process, a suggest candidate is generated and presented as a piece of suggest information.

Figure 16:
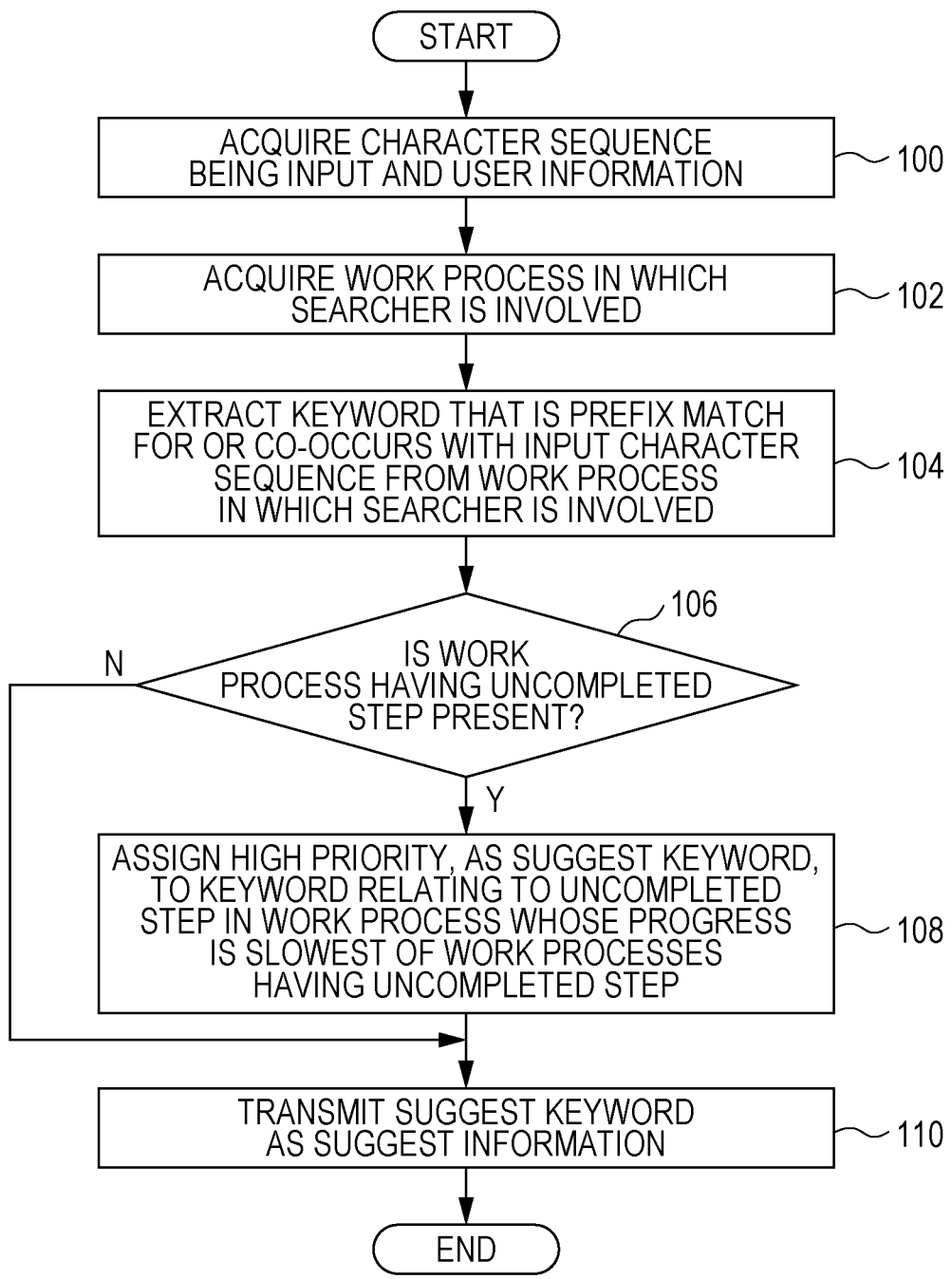
FIG. 16 is a flowchart depicting an example process flow in which a suggest candidate relating to an operation is extracted and presented as a piece of suggest information by a cloud server in the information processing system according to the present exemplary embodiment.

FIG. 16 is a flowchart depicting an example process flow in which a suggest candidate relating to an operation is extracted and presented as a piece of suggest information by the cloud server 16 in the information processing system 10 according to the present exemplary embodiment. The process depicted in FIG. 16 starts, for example, when the information processing terminal 14 is operated and a character is input into the search field 40.

Figure 13:
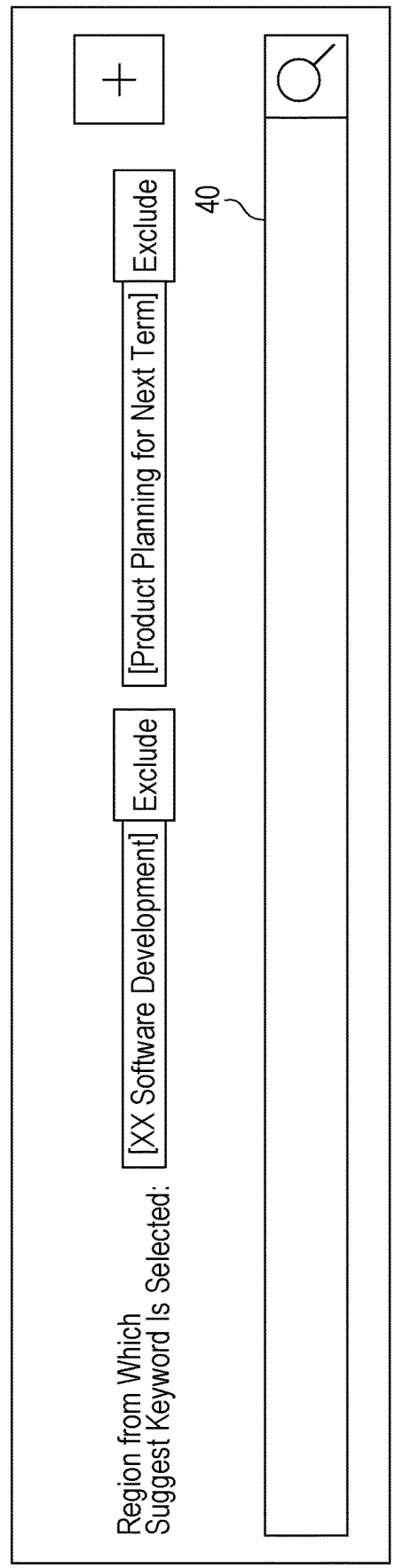
FIG. 13 is an illustration for depicting an example in which a work process that does not relate to a search intension is excluded from a region from which a suggest keyword is selected.

In step 100, the keyword selection unit 22 acquires from the input unit 18 in the information processing terminal 14 a character sequence including characters being input into the search field 40 by a user and information about the user, and the process proceeds to step 102. Specifically, a character sequence, which is used to search for a suggest candidate, and user information, such as user identification information and group information of the user, who inputs data, are acquired. If the user who performs search, or the searcher, specifies at least one of a region from which a suggest keyword is selected and a region in which a document is searched for, as depicted in FIGS. 13 to 15, the specified region may further be accepted in step 100, and the following processing may be performed for the specified region. In this case, step 100 corresponds to an accepting unit.

In step 102, the keyword selection unit 22 acquires a work process in which the searcher is involved, and the process proceeds to step 104. For example, user information and a work process in which a user identified by the user information is involved are stored in advance in the generated-information DB 32 or the like, and thus a work process in which the user is involved is obtained by using the user information.

In step 104, the keyword selection unit 22 extracts a keyword that is a prefix match for or co-occurs with the input character sequence from the work process in which the searcher is involved, and the process proceeds to step 106.

In step 106, the keyword selection unit 22 determines whether a work process having at least one uncompleted step is present. If it is determined that no work process satisfies this condition, the process proceeds to step 110. If it is determined that one or more work processes having at least one uncompleted step are present, the process proceeds to step 108.

In step 108, the keyword selection unit 22 assigns a high priority, as a suggest keyword, to a keyword relating to at least one uncompleted step in the work process whose progress is the slowest of the work processes having at least one uncompleted step, and the process proceeds to step 110.

In step 110, the keyword selection unit 22 transmits the suggest keyword to the information processing terminal 14 as a piece of suggest information, and the process completes a series of procedures. Then, the display unit 20 in the information processing terminal 14 receives the piece of suggest information and presents the suggest keyword on the display 14F. In summary, since a keyword relating to an operation in which the user is involved is presented on the display 14F, the efficiency in searching for target document information is improved.

In the above exemplary embodiment, although an example in which the user operates the information processing terminal 14 to search for a document stored in the document repository 28 is described, this is not meant to be limiting. For example, the user may operate an image forming apparatus or the like to search for a document stored by using a document management service. Further, the above exemplary embodiment may be applied to a case of searching for information other than text information, such as image information.

In the above exemplary embodiment, processing performed by using the single cloud server 16 is described, but this is not meant to be limiting. For example, a plurality of servers, such as a server that manages the document repository 28, a server that manages the generated-information DB 32, and a server that provides a function of the search-and-suggest-information generation unit 30, may each perform assigned functions.

The processing performed by the cloud server 16 according to the above exemplary embodiment may be processing performed by using software, processing performed by using hardware, or processing performed by using a combination of software and hardware. The processing performed by each unit of the cloud server 16 may be stored in a recording medium as a program and distributed by using the recording medium.

The present disclosure is not limited to the above embodiment, and various modifications other than the above embodiment may obviously be practiced as long as they do not depart from the spirit of the disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
an acquiring unit that acquires at least one character input by a user, and user information of the user, and identifies, from the user information, an operation including a work process in which the user is involved; and
a presenting unit that:
searches among pieces of suggest information for a keyword including the at least one character acquired by the acquiring unit, the pieces of suggest information being generated or updated by using pieces of document information registered in advance for each of a plurality of work processes,
extracts a piece of suggest information including a keyword that relates to the identified work process associated in advance with the user information,
prioritizes the piece of suggest information based on a status of the work process, and
presents the piece of suggest information.

2. The information processing apparatus according to claim 1,
wherein the presenting unit further presents an operation associated with a piece of document information including the keyword included in the piece of suggest information that is presented.

3. The information processing apparatus according to claim 1,
wherein the presenting unit prioritizes a piece of suggest information including a keyword that relates to an uncompleted operation and presents the piece of suggest information.

4. The information processing apparatus according to claim 2,
wherein the presenting unit prioritizes a piece of suggest information including a keyword that relates to an uncompleted operation and presents the piece of suggest information.

5. The information processing apparatus according to claim 3,
wherein the presenting unit assigns a higher priority to a piece of suggest information including a keyword that relates to an uncompleted operation whose progress is slower than progress of other uncompleted operations and presents the piece of suggest information.

6. The information processing apparatus according to claim 4,
wherein the presenting unit assigns a higher priority to a piece of suggest information including a keyword that relates to an uncompleted operation whose progress is slower than progress of other uncompleted operations and presents the piece of suggest information.

7. The information processing apparatus according to claim 1, further comprising:
an accepting unit that accepts a region from which a keyword included in a piece of suggest information is selected.

8. The information processing apparatus according to claim 2, further comprising:
an accepting unit that accepts a region from which a keyword included in a piece of suggest information is selected.

9. The information processing apparatus according to claim 3, further comprising:
an accepting unit that accepts a region from which a keyword included in a piece of suggest information is selected.

10. The information processing apparatus according to claim 4, further comprising:
an accepting unit that accepts a region from which a keyword included in a piece of suggest information is selected.

11. The information processing apparatus according to claim 5, further comprising:
an accepting unit that accepts a region from which a keyword included in a piece of suggest information is selected.

12. The information processing apparatus according to claim 6, further comprising:
an accepting unit that accepts a region from which a keyword included in a piece of suggest information is selected.

13. The information processing apparatus according to claim 7,
wherein the accepting unit further accepts a region in which a piece of document information is searched for by using the keyword included in the piece of suggest information presented by the presenting unit.

14. The information processing apparatus according to claim 8,
wherein the accepting unit further accepts a region in which a piece of document information is searched for by using the keyword included in the piece of suggest information presented by the presenting unit.

15. The information processing apparatus according to claim 9,
wherein the accepting unit further accepts a region in which a piece of document information is searched for by using the keyword included in the piece of suggest information presented by the presenting unit.

16. The information processing apparatus according to claim 10,
wherein the accepting unit further accepts a region in which a piece of document information is searched for by using the keyword included in the piece of suggest information presented by the presenting unit.

17. The information processing apparatus according to claim 11,
wherein the accepting unit further accepts a region in which a piece of document information is searched for by using the keyword included in the piece of suggest information presented by the presenting unit.

18. The information processing apparatus according to claim 12,
wherein the accepting unit further accepts a region in which a piece of document information is searched for by using the keyword included in the piece of suggest information presented by the presenting unit.

19. A non-transitory computer readable medium storing an information processing program causing a computer to function as each unit of the information processing apparatus according to claim 1.

20. An information processing apparatus comprising:
means for acquiring at least one character input by a user, and user information of the user, and identifying, from the user information, an operation including a work process in which the user is involved; and
means for:
searching among pieces of suggest information for a keyword including the at least one character that is acquired, the pieces of suggest information being generated or updated by using pieces of document information registered in advance for each of a plurality of work processes,
extracting a piece of suggest information including a keyword that relates to the identified work process associated in advance with the user information,
prioritizing the piece of suggest information based on a status of the work process, and
presenting the piece of suggest information.

* * * * *